(12) United States Patent
Faires et al.

(10) Patent No.: US 7,651,388 B2
(45) Date of Patent: Jan. 26, 2010

(54) PORTIONING APPARATUS AND METHOD

(75) Inventors: David Faires, Lake Forest Park, WA (US); David A. Below, Port Clinton, OH (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 11/321,725

(22) Filed: Dec. 28, 2005

(65) Prior Publication Data

US 2006/0156878 A1    Jul. 20, 2006

Related U.S. Application Data

(60) Provisional application No. 60/640,282, filed on Dec. 30, 2004.

(51) Int. Cl.
*A22C 17/00* (2006.01)
(52) U.S. Cl. .................. 452/157; 452/150; 452/155; 452/177
(58) Field of Classification Search ......... 452/155–157, 452/170, 177, 149, 150; 83/105, 177, 155, 83/367, 813, 13, 365, 368; 700/112, 160, 700/28, 171, 173
See application file for complete search history.

(56) References Cited

U.S. PATENT DOCUMENTS

| 4,875,254 | A | | 10/1989 | Rudy et al. | |
|---|---|---|---|---|---|
| 4,962,568 | A | * | 10/1990 | Rudy et al. | ................. 452/157 |
| 5,076,124 | A | * | 12/1991 | Whitehouse | ................. 83/367 |
| 5,585,603 | A | * | 12/1996 | Vogeley, Jr. | ................. 702/175 |
| 7,373,217 | B2 | * | 5/2008 | Young | ......................... 700/127 |
| 2003/0145699 | A1 | * | 8/2003 | Kim et al. | ...................... 83/13 |

FOREIGN PATENT DOCUMENTS

| GB | 2 364 894 A | 2/2002 |
|---|---|---|
| WO | WO 03/037090 A1 | 5/2003 |
| WO | WO 2004/106020 A1 | 12/2004 |

* cited by examiner

*Primary Examiner*—Charles R Kasenge
(74) *Attorney, Agent, or Firm*—Christensen O'Connor Johnson Kindness PLLC

(57) ABSTRACT

Portioning system (10) includes a conveyor (12) for conveying work products (14) past a scanner (16). A data processor (22) receives the scanning data and generates a thickness and/or volume distribution of the work product. The processor is programmed to determine in advance how the work product may be portioned into a plurality of desired end products, and more specifically how one or more of the end products may be cut and then subsequently sliced without having to re-scan the cut portion. The processor controls a cutting device (18) for portioning the work product under the cutting strategy determined by the processor, and also controls a slicing device (20) for subsequently slicing one or more of the cut portions to achieve a desired thickness per the determined cutting strategy.

18 Claims, 4 Drawing Sheets

PORTIONING APPARATUS AND METHOD

CROSS-REFERENCE TO RELATED APPLICATION

This application is based on and claims the benefit of U.S. Provisional Application No. 60/640,282, filed Dec. 30, 2004.

TECHNICAL FIELD

The present invention relates to processing work products, and more specifically to estimating and optimizing the yield from portioning work products, such as food products.

BACKGROUND

Work products, including food products, are cut or otherwise portioned into smaller portions by processes in accordance with customer needs. Also, excess fat, bone and other foreign or undesirable materials are routinely trimmed from the food products. Much of the portioning/trimming of work products, in particular food products, is now carried out with the use of automated portioning machines. These machines use various scanning techniques to ascertain the size and shape of the work product as it is being advanced on a moving conveyor. This information is analyzed with the aid of a computer to determine how to portion the work product into the desired sizes, weights or other criteria being used. For example, if work product portions of a specific weight are desired, the information from the scanner may be employed to control the operation of a crosscutting device to cut the work product into the desired portion sizes. If the work product changes in width or thickness along its length, the location of the crosscut made in the work product to achieve a desired end portion weight may be controlled.

Work products may be thicker than desired for the portions to be cut from the work product. To achieve satisfactory thicknesses, a horizontal slicer may be used. Generally, the slicing operation occurs prior to the cutting process which, as noted above, is carried out by automated portioning machines. With the slicing done ahead of the portioner, the entire workpiece is sliced. If the workpiece is not of uniform thickness, at least some of the material trimmed from the workpiece may be relatively thin and, as such, of low economic value.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A portioning apparatus includes a conveyor for conveying work products to be portioned, and a scanner for scanning the work product as the work product is being transported by the conveyor. A data processor receives the data from the scanner and determines the thickness profile of the work product. The processor is programmed to predetermine how the work product may be portioned into a plurality of desired end portions or products where one or more of the portions cut from the work product may be subsequently sliced by a slicer to achieve a desired physical parameter for the end product without having to re-scan the cut portion to be sliced.

The system may also include a cutter for cutting the work product into select portions. The system may also include a slicer to slice selected cut portions into desired thickness to achieve the desired physical configuration of the end product's portion from the work product.

The foregoing system may be used to perform various portioning methods, including a method consisting of the steps of scanning a work product and then using such scanning information to determine the three-dimensional configuration of the work product. A determination is made as to how the work product may be portioned based on desired end products achieved from the scanned work product, bearing in mind that the cut portions may be sliced into specific thicknesses subsequent to the cutting operation. The method also includes cutting the work product into two-dimensional shapes based on the cutting strategy determined, then slicing specific two-dimensional shapes to achieve a desired thickness of the portioned end product.

The method may also include slicing selected cut portions into fixed thicknesses.

The method also contemplates slicing the cut two-dimensional shapes into different thicknesses specific to the desired three-dimensional configuration of the end product portion.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
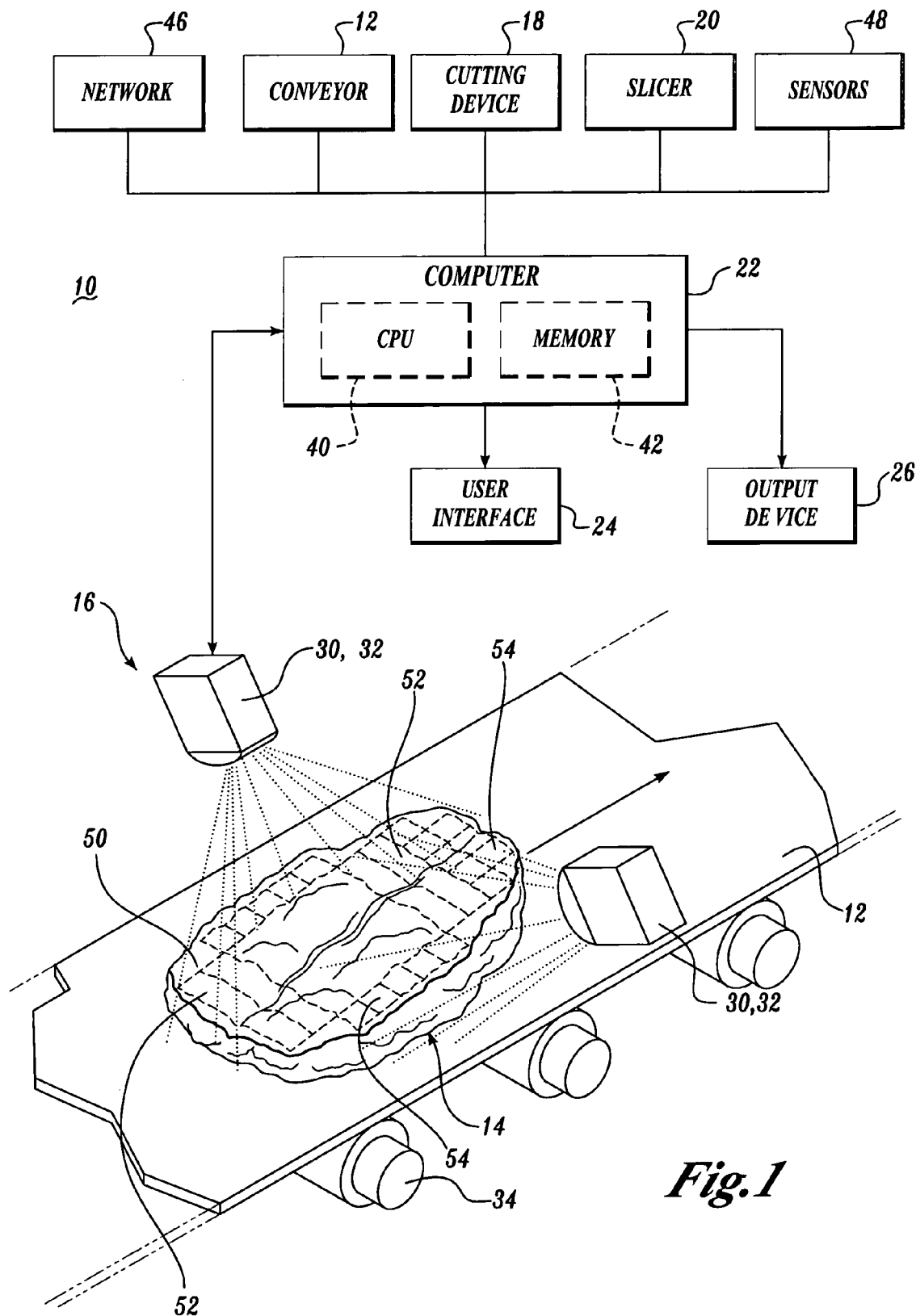
FIGS. 1, 2, and 3, in combination comprise a schematic view of a disclosed embodiment.
Figure 2:
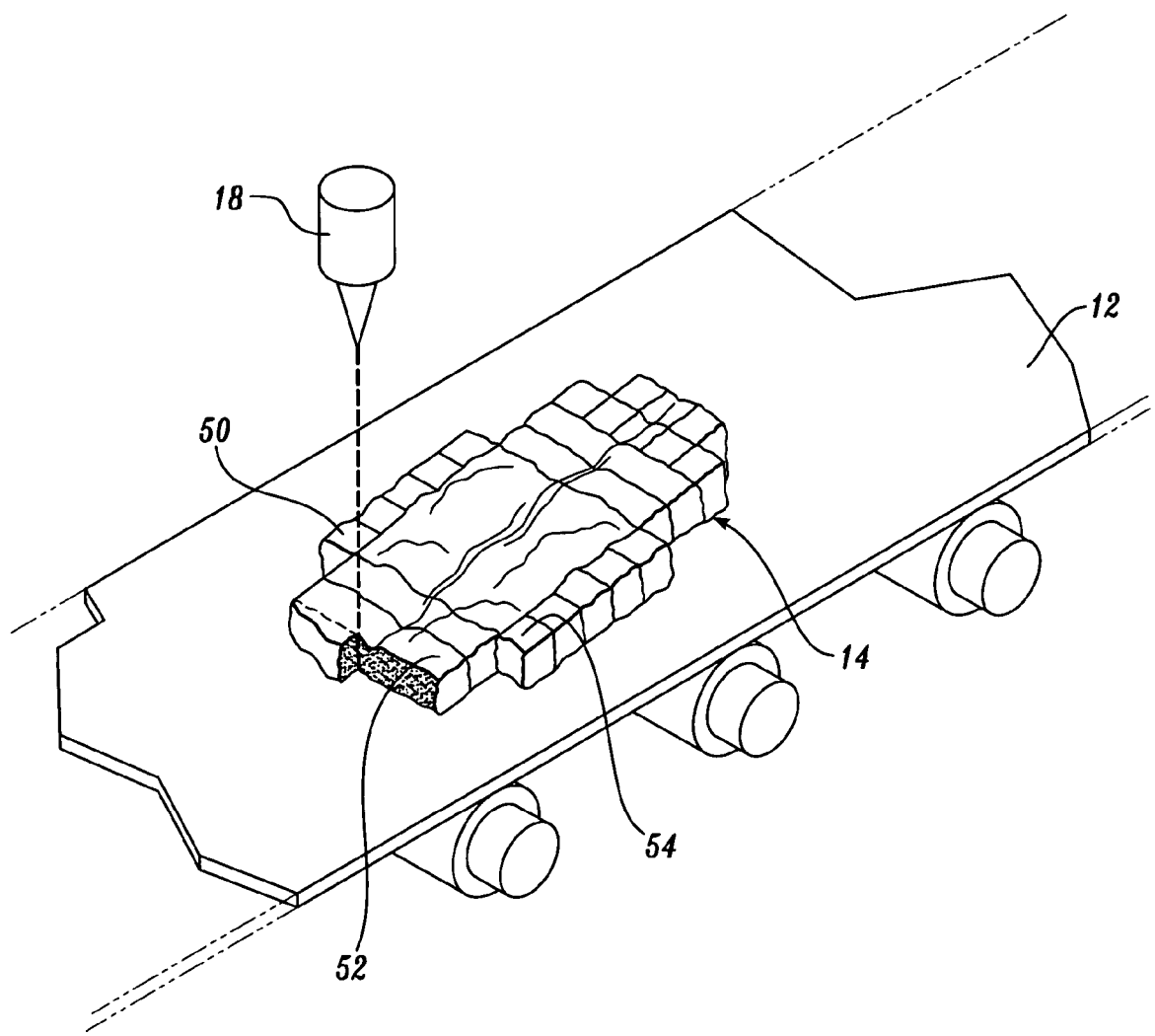
Figure 3:
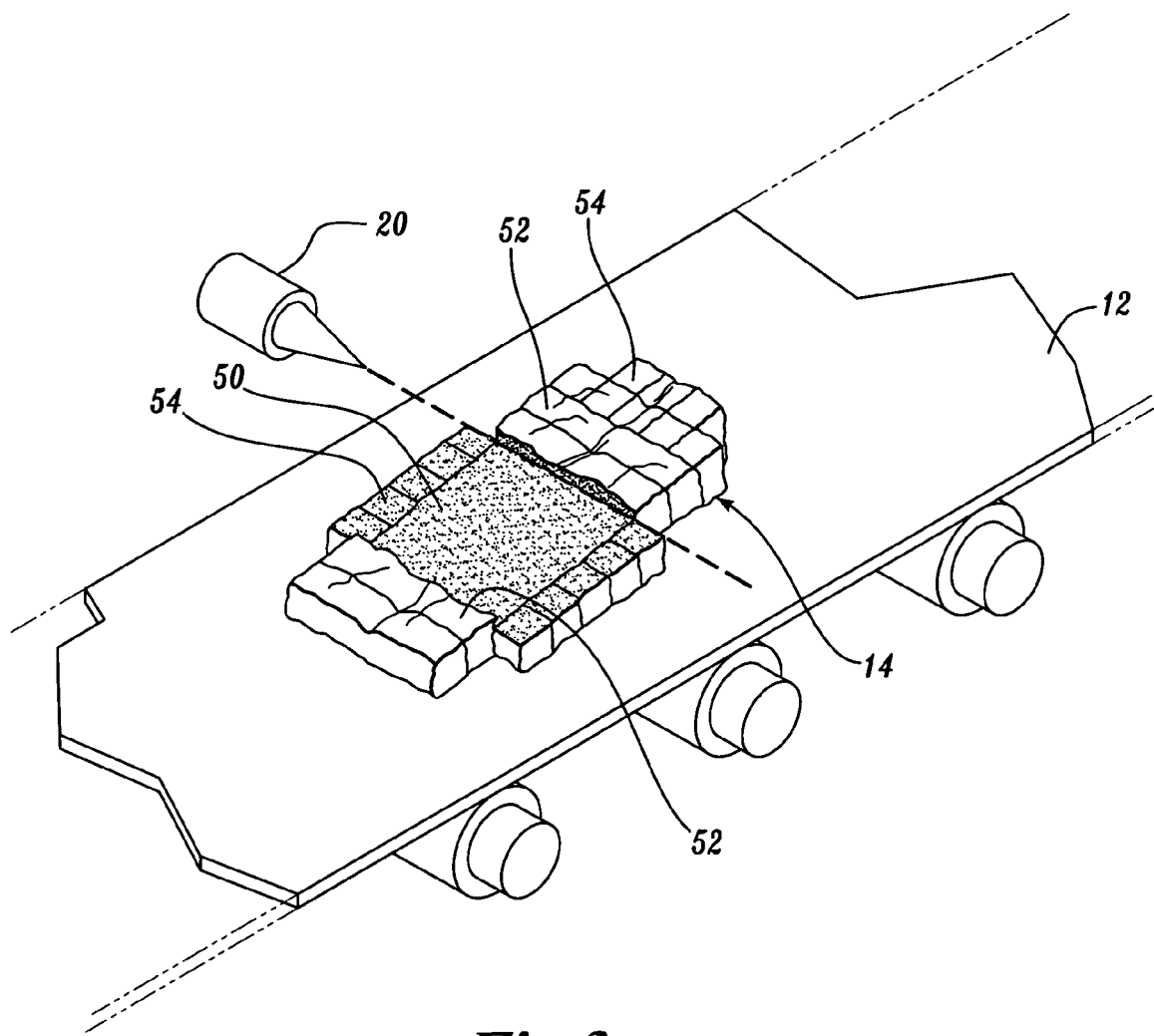

FIGS. 1-3 schematically illustrate a portioning system 10 suitable for implementing an embodiment of the present invention. Of course, multiple conveyors can be used in conjunction with the present invention. The portioning system 10 includes conveyor 12 for carrying a work product 14 to be portioned. The system 10 also includes a scanning system 16 for scanning the work product 14 and a cutter 18 for cutting the work product into one or more pieces of desired sizes or other physical parameters. A slicer 20 is schematically illustrated in FIG. 3 as located downstream from the cutter 18. The conveyor 12, the scanning system 16, the cutter 18, and slicer 20 are coupled to, and controlled by, processor 22. As illustrated, the processor includes a user interface 24 (keyboard, mouse, etc.) and an output device 26 (monitor, printer, etc.).

Generally, the scanning system 16 scans the work product 14 to produce scanning information representative of the work product, and forwards the scanning information to the processor 22. The processor 22 analyzes the scanning data to develop a thickness profile of the scanned work product. The processor also develops an area and/or volume distribution of the scanned work product. The processor 22 then can model the work product to determine how the work product might be portioned into end product sets composed of one or more end products of specific physical criteria, including, for example, weight, shape, thickness, length, or width. In this regard, the processor takes into consideration that the thickness of the work product may be altered after the work product has been portioned by the cutter 18. In addition, the processor factors in any defects found in the work product during the scanning process. With all these criteria and factors in mind, the processor determines how the work product may be portioned into one or more end product sets. The processor 22 then controls the cutter 18, as well as the slicer 20, to portion the work product according to the selected end product set.

Describing the foregoing systems in more detail, the conveyor 12 carries the work product 14 beneath a scanning system 16. The scanning system 16 may be of a variety of different types, including a video camera 30 to view a work product 14 illuminated by one or more light sources 32. Light from the light source is extended across the moving conveyor belt 48 to define a sharp shadow or light stripe line, with the area forwardly of the transverse beam being dark. When no work product 14 is being carried by the infeed conveyor 12, the shadow line/light stripe forms a straight line across the conveyor belt. However, when a work product 14 passes across the shadow line/light stripe, the upper, irregular surface of the work product produces an irregular shadow line/light stripe as viewed by a video camera 32 directed diagonally and downwardly on the work product and the shadow line/light stripe. The video camera detects the displacement of the shadow line/light stripe from the position it would occupy if no work product were present on the conveyor belt. This displacement represents the thickness of the work product along the shadow line/light stripe. The length of the work product is determined by the distance of the belt travel that shadow line/light stripes are created by the work product. In this regard, an encoder 34 is integrated into the infeed conveyor 12, with the encoder generating pulses at fixed distance intervals corresponding to the forward movement of the conveyor.

In lieu of a video camera, the scanning station may instead utilize an x-ray apparatus for determining the physical characteristics of the work product, including its shape, mass, and weight. X-rays may be passed through the object in the direction of an x-ray detector (not shown). Such x-rays are attenuated by the work product in proportion to the mass thereof. Scanner system 16 includes a generator 30 to irradiate the work product 14 to be scanned with X-ray radiation and a receiver 32 to receive the attenuated radiation. The receiver portion 32 can be integral with the generator 30.

Attenuation of the X-rays can occur by passing through the work product or by reflection from the work product. When radiation passes through the work product, a certain amount of radiation is absorbed by the work product through which it passes, therefore there will be a relationship in the amount between the radiation sent to the work product and the radiation received after it has passed through the work product. The cause of absorption is believed to reside in the chemical bonds within the molecules of the work product. Radiation once attenuated can be collected and converted into a useable form. Photodiodes, for example, may be used to convert an amount of radiation in the visible range into a voltage or current signal. For X-rays, a scintillating material may be used to generate visible light capable of detection by a photodiode. This method is described in U.S. Pat. No. 5,585,603 to Vogeley, Jr., which is herein incorporated by reference.

The foregoing scanning systems are known in the art and, thus, are not novel per se. However, the use of these scanning systems in conjunction with the other aspects of the described embodiments are believed to be new.

The data and information measured/gathered by the scanning device(s) is transmitted to the processor 22, which records the location of the work product 14 on the conveyor 12, as well as the length, width and thickness of the work product about the entire area of the work product. With this information, the processor can develop an area profile as well as a volume profile of the work product. Knowing the density of the work product, the processor can also determine the weight of the work product or segments thereof.

The scanning information can also be used to ascertain whether there are any defects in the work product. Such defects might include tears, holes, fat, bone, or cartilage. For example, if an x-ray apparatus is utilized, and if a hole or tear exists, the x-rays will be attenuated to a lesser extent than if the work product was structurally intact. Also, for work products composed of raw meat, the density of fat, bones, and cartilage is different from the density of the meat. This density variation results in a difference in the attenuation of the x-rays passing through the work product. For example, the density of bone is greater than the density of meat. Thus, the x-rays passing through the bone will be attenuated to a greater extent than the x-rays passing through the meat. As a consequence, by the scanning process, the existence as well as the position and size of the defects in the work product may be ascertained. Examples of the foregoing scanning devices are disclosed in U.S. Pat. No. 6,563,904, incorporated by reference herein.

Preferably the computer 22, having a central processing unit 40 (hereinafter CPU) and a memory 42, will be used in the method according to the present invention. Data consisting of desired end product shapes are stored in the computer memory 22. The memory can store additional maps that can readily be selected by a user via a user interface 24, for example, when changing product lines. For instance, the user may be processing chicken breasts for a particular customer who may have a particular desired shape; when the order of the customer is filled, the user may switch the mode of the computer to a different product to meet the specifications of a different customer. This switch may be automated and triggered by a counter that keeps track of the number of work product portions that have been processed, or the switch may be carried out manually to allow the user time to retool any apparatus or recalibrate. In other alternate embodiments, a library of maps for a whole production plan can be stored in the memory of a computer.

As shown in FIG. 1, the computer 22 can be in communication with a network system 46 which allows the computer 22 to talk to and share information with other computers. Computer 22 can also drive other periphery hardxvare besides the scanner system 16. For instance, computer 22 can direct the operation of the conveyor 12, cutting device 18, and slicer 20. Finally, computer 22 can receive information from various sensors 48 to guide or direct a multitude of systems.

Various types of cutting devices 18 may be utilized to cut the work product 14 into smaller end portions. Examples of cutting devices include high-speed water jets, lasers, rotary saws, hacksaws, guillotines, and band saws. Such cutting devices are articles of commerce. Cutting devices of the foregoing nature are described in U.S. Pat. No. 5,931,178, to Pfarr, which is incorporated herein by reference. Band saws and blades are described in U.S. Pat. No. 5,937,080, to Vogeley, Jr., et al., which is herein also incorporated by reference. The processor 22 can control the cutting path of the cutting devices 18 to automatically segment the work product into a set of smaller end product portions.

As shown in FIG. 3, slicer 20 is located downstream from the cutter 18. Various types of slicers may be utilized to slice the work product into one or more desired thicknesses. For example, the slicer may be in the form of a high-speed water jet, a laser, a rotary saw, a hacksaw, or band saw. Also, the slicer may be adjustable so that a desired thickness of each individual work product is obtained. Such adjustment may be under the control of the processor 22.

The slicer 20 is used to alter the thickness of the work product. The work product, or portions of the work product, may be substantially thicker than desired for end products portioned from the work product. For example, if sandwich portions are to be cut from chicken breasts, part or the entire chicken breast may be substantially thicker than the desired sandwich portion. As a consequence, it is necessary to slice the chicken breast to obtain thickness that is within acceptable limits.

With the slicer located downstream of the cutter 18, the slicer can be selectively utilized on selected portions of the work product after the operation of the cutter 18. For example, the cutter 18 may be used to cut a specific portion 50 from the work product, and thereafter, that specific portion may be sliced to achieve a desired thickness as well as a desired product shape or area. The remainder of the work product that is not sliced can remain in its original thickness, which may be thicker than the sliced portion, thus available for other uses requiring thicker portions. If the entire work product is sliced before cutting, then the remainder of the work piece, exclusive of specific portion 50, may be too thin for most uses, thus reducing the overall economic value of the work piece. This may be avoided by being able to slice selected portions of the work piece, such as portion 50, after cutting.

The work product 14 may be cut and sliced in different orders. For example, referring to FIG. 2, a portion 50 of the workpiece 14 may first be cut by cutter 18, and then such portion 50, shown in FIG. 3, may be sliced to a desired thickness. In doing so, the entire width of the workpiece 14 corresponding to the portion 50 also will be sliced to the desired thickness. When the portion 50 is being cut by cutter 18, the remaining portion 15 may also be cut into desired end pieces, for example, strip pieces 52 as well as cube pieces 54. As will be appreciated, because of the slicing of the portion 50, the cube pieces located alongside portion 50 will be reduced in thickness to the thickness of the portion 50, see FIG. 3.

Other cutting and slicing procedures may be utilized. For example, portion 50 may first be cut from the work piece 14 by cutter 18. At the same time, the additional portions 52 and 54 also may be cut. Thereafter, the end product piece 50 to be subsequently sliced, may be separated from the remainder of the work piece, for example, by being picked up and moved to another location on the conveyor 12, which location is known to the portioning system 10. With this known location, the slicer 20 can subsequently slice the cut portion 50 to a desired thickness. The remaining cut portions 52 and 54 can continue on the conveyor, to be subsequently offloaded and placed at a desired location. The portion 50, after being sliced by slicer 20, may also be offloaded at a desired location.

Rather than moving the cut portion 50 to a new location, the cut portion may remain at its location on the conveyor 12, and the remainder of the workpiece 14, including the cut portions 52 and 54, may be removed from the conveyor with the pickup device, or moved to another location on the conveyor with a pickup device. In this situation, only the portion 50 will be sliced by slicer 20, and the remainder of the portion 15, including the portions 52 and 54, can remain in original thickness. This generates less trim and more useable end product than if the entire work piece 14 were sliced by slicer 20 or even if the entire width of the workpiece corresponding to end piece 50 were sliced by the slicer 20. As a consequence, the yield from the workpiece 14 is improved.

Various pickup devices can be used in conjunction with the present invention. Such pickup devices may be operated by suction, by clamping action, by one or more forks that stab the work product, etc. An example of such pickup device is disclosed in U.S. Pat. No. 6,826,989, incorporated herein by reference. Arms or gates, not shown, may be used in conjunction with such pickup devices to move or remove the work product residual of cut portion 50 so that only the cut portion is sliced by slicer 20.

Figure 4:
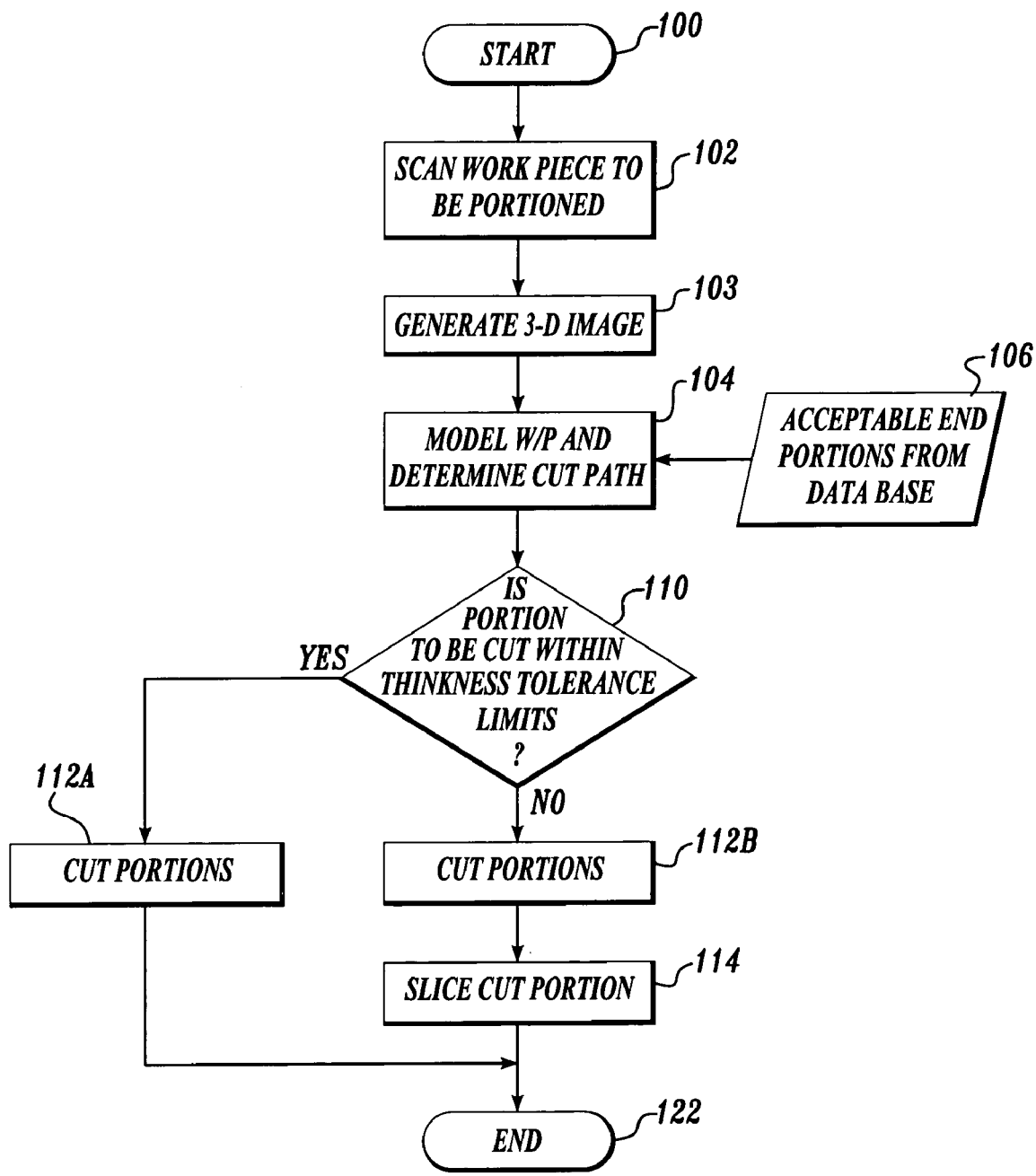
FIG. 4 is a flow diagram of a disclosed embodiment.

The system 10, described above, may be utilized to predetermine how work product 14 may be portioned by a combination of initially cutting the work product and then optionally slicing one or more of the cut work product portions. The end portions may be of the same or of differing sizes depending on how the work product may be most efficiently portioned, as well as depending on customer needs. FIG. 4 schematically illustrates one method of using system 10 to portion work product 14 in the foregoing manner.

The method starts at 100 and includes the step 102 of scanning the work piece to be portioned. Thereafter, at step 103, the scanning information is used to generate volume distribution of the work piece. Next, at step 104, the processor is used to model the work piece to determine how the work piece might be portioned into end product sets composed of one or more end products of specific physical criteria, for example, weight, shape, thickness, length, or width. Information on such criteria and desired end product sets is available to the processor from database 106. The processor also considers how the portions cut from the work product may be sliced to a required thickness after cutting. The processor uses all this information to determine how to optimally cut the work piece, as well as to determine which of the cut work pieces are to be sliced after cutting. At decision step 110, if the processor has determined that a particular cut portion of the work piece will not be sliced, then cutting occurs at 112A, and then the present method for that particular cut portion has been completed. However, if the processor has determined that the cut portion is to be subsequently sliced, cutting occurs at step 112B and then subsequently slicing occurs at step 114 to complete the method.

Of course, other methods may be utilized in conjunction with portioning system 10. For example, as noted above, after being cut, portions to be sliced may be separated from the remainder of the cut portions and then sliced separately from the remaining cut portions.

As a further alternative, the cut portions to be subsequently sliced may be left in place, and the remainder of the cut portions and trim may be removed or otherwise separated from such work piece. In this manner, only the designated cut portions are sliced.

While the preferred embodiment of the invention has been illustrated and described, it will be appreciated that various changes can be made therein without departing from the spirit and scope of the invention.

For example, although the foregoing description discussed scanning by use of a video camera 30 and light source 32, as well as by use of x-rays, other three-dimensional scanning techniques may be utilized. For example, such additional techniques may be by ultrasound or moire fringe methods. In addition, electromagnetic imaging techniques may be employed. Thus, the present invention is not limited to use of video or x-ray methods, but encompasses other three-dimensional scanning technologies.

The embodiments of the invention in which an exclusive property or privilege is claimed are defined as follows:

1. A method of portioning a work product comprising the steps of:
   (a) scanning the work product;
   (b) determining the three-dimensional configuration of the work product prior to portioning of the work product from the data obtained during the scanning of the work product;
   (c) determining in advance how the work product is to be portioned into a plurality of end products based on the determined three-dimensional configuration of the unportioned work product and the desired end products achieved by cutting the work product in a first direction into two-dimensional shapes and then subsequently slicing selected of the cut two-dimensional shapes into a plurality of desired, specific thicknesses in a direction substantially transverse to the direction of cutting the work product;

(d) cutting the work product in a first direction into the pre-determined product two-dimensional shapes; and (e) slicing one or more of the cut two-dimensional shapes as viewed in a direction substantially transverse to the direction of cutting the work product into a plurality of independent desired thicknesses, to achieve desired three-dimensional configurations of the end products.

2. The method of claim 1, wherein the step of determining how the work product is to be portioned is based on one or more criteria of the group consisting of the area, shape, and weight of the desired end products.

3. The method according to claim 1, wherein the step of determining how to portion the work product includes determining how the work product can be portioned into a plurality of desired end products of one or more three-dimensional configurations, taking into consideration desired physical criteria for the end products and subsequent slicing of one or more of the portions after cutting the portions from the work product.

4. The method according to claim 3, wherein more than one of the determined end products are selected for slicing after being cut into a two-dimensional shape portion size thereby to alter the thickness of the two-dimensional portion.

5. The method according to claim 3, wherein the step of determining how to portion the work product to achieve desired end products is based on at least one of the desired end products not being sliced after being cut from the work product.

6. The method according to claim 3, wherein in the step of determining how the work product should be portioned, the plurality of end products are determined to be obtained from the work product, and wherein at least one of the end product portions cut will be sliced after cutting to achieve the desired three-dimensional physical configuration of the end product portion, and at least one of the portions cut from the work product will not be sliced after cutting to achieve the desired three-dimensional physical configuration of the end product portion.

7. The method according to claim 1, wherein the step of slicing the two-dimensional shape comprises slicing at a desired variable thickness specific to the desired three-dimensional configuration of the end work product.

8. A method of portioning of raw food product into a plurality of end products of desired physical parameters, comprising the steps:

(a) scanning the food product;

(b) prior to portioning of the food product, determining the thickness of the food product about the area of the food product, thereby to develop a thickness profile of the food product from the information gained during the scanning of the food product;

(c) calculating how the area of the food product might be portioned into a plurality of end products based on pre-determined physical criteria for desired end food products cut from the food product, as well as based on slicing one or more of the portions cut from the food product into a plurality of desired thicknesses, said slicing occurring in a direction generally transverse to the cutting of the food product;

(d) cutting the food product into a plurality of calculated two-dimensional area portions; and (e) slicing selected of the cut area portions each to desired independent specific thicknesses generally transverse to the direction of cutting to achieve the desired physical parameters of the end food products.

9. The method according to claim 8, wherein the physical parameters of the end food products cut from the food product include parameters selected from the group consisting of the weight of the end product, the shape of the end product, and the area of the end product.

10. The method according to claim 8, wherein the step of calculating how to portion the food product is based on at least one of the cut area portions not being sliced after being cut from the food product.

11. The method according to claim 10, wherein in the step of cutting the food product into area portions, all of the calculated end food products cut from the food product are cut into area portions at the same time.

12. The method according to claim 8, comprising a food product selected from the group consisting of chicken breasts, turkey breasts, duck breasts, tri-tip steaks, and fish fillets.

13. The method according to claim 8, wherein the slicing of the cut area portions varies in thickness depending on the desired physical parameter of the end food product.

14. A portioning apparatus comprising:

(a) a conveyor for conveying work products to be portioned;

(b) a scanner for scanning the work product as the work product is being transported by the conveyor;

(c) a data processor for receiving the data from the scanner and using such data to determine, prior to portioning of the work product, a thickness profile of the unportioned work product consisting of the thickness of the work product in the direction substantially transverse to the plane of the conveyor about the area of the work product; and (d) wherein the data processor is programmed to predetermine how the work product may be portioned into a plurality of desired end products, including where portions are to be cut from the work product into a plurality of two-dimensional shapes, as viewed in the direction generally transversely to the plane of the conveyor, and then selected of the cut portions may be subsequently sliced in a direction generally parallel to the plane of the conveyor, to alter the thickness of the cut portions into a plurality of independent desired thicknesses to achieve desired physical parameters for the end products without having to rescan the cut portions to be sliced.

15. The apparatus according to claim 14, further comprising a cutter for cutting the work product into a plurality of portions defined by two-dimensional shapes as viewed in the direction generally transversely to the plane of the conveyor.

16. The apparatus according to claim 15, further comprising a slicer to slice one or more cut portions in a direction generally parallel to the plane of the conveyor, into a plurality independent desired thicknesses to achieve desired physical configurations of the end products portioned from the work product.

17. The apparatus according to claim 16, wherein the slicer is adjustable so as to slice each of the cut portions into desired, independent selected thicknesses based on the desired physical configurations of the end products being sliced.

18. The apparatus according to claim 14, wherein the physical parameters of the end products cut and/or sliced from the work product include parameters selected from the group consisting of the weight of the end product, the area of the end product, the two-dimensional shape of the end product, and the thickness of the end product in a direction generally transverse to the plane of the two-dimensional shape.

* * * * *